Jan. 7, 1964 E. D. SAYRE 3,116,981
MOLYBDENUM AND HIGH TEMPERATURE OXIDATION RESISTANT
ALLOY LAMINATED COMPOSITE MATERIAL
Filed March 17, 1960
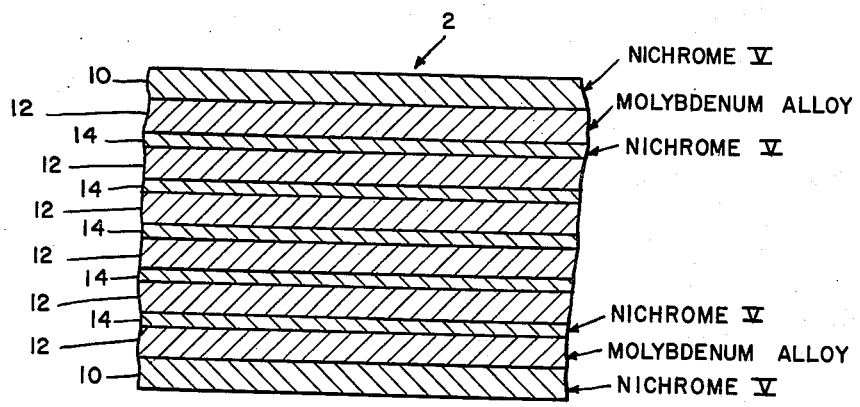
INVENTOR.
E. D. SAYRE
BY
ATTORNEYS 3,116,981
MOLYBDENUM AND HIGH TEMPERATURE OXIDATION RESISTANT ALLOY LAMINATED COMPOSITE MATERIAL
Edwin D. Sayre, Cincinnati, Ohio, assignor to the United States of America as represented by the Secretary of the Air Force
Filed Mar. 17, 1960, Ser. No. 15,773
11 Claims. (Cl. 29—183.5)

This invention relates to improved means for inhibiting the oxidation of molybdenum and molybdenum based alloys at high temperatures and under corrosive atmospheric conditions.

Molybdenum and molybdenum based alloys which are in the class of the so-called refractory metals have a great potential in aircraft gas turbine designs because of their high strength at elevated temperatures. However, their very poor oxidation resistance renders them useless above 800° F.

Methods presently employed consist of making the part, such as a turbine bucket by forging and machining the alloy and applying a protective metallic or ceramic coating or cladding. In the advent of failure of this coating or cladding, the base metal alloy is exposed to oxygen and reacts to form volatile oxides which cause a considerable loss of the base metal and ultimately the failure of the part.

An object of this invention is to combine in laminated structures a base metal consisting of molybdenum or molybdenum alloy alternated with a high temperature oxidation resistant alloy such as Nichrome V to provide a material which is highly resistant to oxidation at high temperatures.

Another object is to form a laminated body comprising sheets of oxidation resistant material and layers of molybdenum so that if the outside clad of oxidation resistant material fails, only a very thin sheet of molybdenum alloy is available for oxidation before the next oxygen barrier takes over to protect the laminated body remaining.

Another object is then prolonged life at elevated temperatures of the part comprising the laminated materials.

Another object of this invention is an improved method of forming the laminated composite body described herein to be used in the making of a turbine bucket or the like.

Other and further objects and advantages of the invention will become apparent from the following description, taken in conjunction with the accompanying drawing in which The single FIGURE of the drawing shows a fragmentary enlarged sectional view of the composite laminated metal body comprising sheets of oxidation resistant Nichrome V alternated with molybdenum alloy.

Referring to the single figure of the drawing, it can be seen that the composite body 2 comprises alternating sheets 10 of Nichrome V and sheets 14 of molybdenum alloy. The use of the expression molybdenum alloy hereafter is intended to also include as an alternative the metal molybdenum. The metal molybdenum contemplated herein is the element molybdenum of atomic No. 42. The molybdenum alloys referred to herein are alloys of molybdenum with titanium, for example, an alloy that has the composition by weight of 99.5% molybdenum and 0.5% titanium. It is to be understood, however, that the specific composition of the molybdenum alloy is not critical as long as materials of high strength are employed. Refractory metals and alloys which include the metal molybdenum have the advantages, where such characteristics are desirable, of being difficult to fuse, difficult to reduce, unmanageable and the like.

Nichrome V is a trademark registered to Driver-Harris Co. of Harrison, New Jersey, for an alloy that consists of by weight 80% Ni and 20% Cr, of melting point 2550° F., speicfic gravity 8.41 and a tensile strength of from 100,000 to 200,000 pounds per square inch.

The total volume of molybdenum illustratively is not less than two-thirds the volume of the laminated metal composite body. The thickness of the internal sheets of Nichrome V or comparable high temperature oxidation alloy is illustrated in the drawing as being small as compared with the thickness of the molybdenum sheets. The specific thickness selected should be withtin the range of 0.001 to 0.01 inch depending on the desired strength of the body.

The preferred embodiment shown in the single figure of the drawing shows all of the sheets 12 of the molybdenum alloy being of equal thickness, preferably 0.005 inch. Nichrome V on the outer surfaces of the composite body are also the same thickness as the molybdenum alloy. However, the inner sheets 14 of Nichrome V are preferably only 0.002 inch thick. As disclosed, the alternating sheets are stacked to a total thickness of 0.050 inch, hot pressed to 0.040 inch and then hot rolled to 0.030 inch.

The hot pressing operation should take place in a sufficiently reducing atmosphere at a satisfactory diffusion welding temperature of the order of 2200° F. The specific temperature and pressure employed in the hot pressing operation are interdependent one upon the other. When the temperature is high, the pressure is accordingly lower than would be necessary if the temperature was low. This is true to the extent that if a high enough pressure is used, the temperature could be at room temperature and a limited amount of diffusion between the laminas would result. Furthermore, the desired percentage reduction in thickness of the composite body during each rolling operation will be an important factor in determining the specific temperature and pressure to be employed. Suitable atmospheres are provided by hydrogen or disassociated ammonia and suitable inert atmospheres are provided by vacuum or inert gases such as argon and the like. The hot pressed compact is then cold worked to obtain the ultimate desired thickness and properties.

The laminated material made by the above process may be used to fabricate turbine buckets, nozzle diaphragm partitions and other high temperature parts. These parts may also be forged from bar stock made of laminates. In practice, it has been found that design utilization of an air cooled turbine bucket made of laminated molybdenum sheets will perform successfully at turbine inlet temperatures in excess of 2600° F.

It is apparent that in practicing the invention as taught herein, that the edges of the laminated material will need to be protected from oxidation, especially in the area of the molybdenum sheets. The limited oxidation along the edges of the molybdenum sheets may be inhibited by either coating or cladding the exposed edges of the laminated material or where turbine buckets or the like are being fabricated, the edges are welded closed during the fabrication process.

It is to be understood that variations may be made in the examples of techniques without departing from the spirit and scope of the invention.

I claim:

1. The combined laminated stacked structure preparatory to its formation into a unitary laminate, that consists of a plurality of sheets of molybdenum that are each 5 mils thick, and that are alternated with a plurality of sheets that contain by weight 80% nickel and 20% chromium and that are each 2 mils thick.

2. The combined laminated stacked structure preparatory to its formation into a unitary laminate, that consists of a plurality of sheets that have the composition by weight of 99.5% molybdenum and 0.5% titanium that are each 5 mils thick, and that are alternated with a plurality of sheets that contain by weight 80% nickel and 20% chromium and that are each 2 mils thick.

3. The combined laminated structure that consists of a plurality of sheets of molybdenum that are each 4 mils thick, and that are alternated with a plurality of sheets that contain by weight 80% nickel and 20% chromium and that are each less than 2 mils thick.

4. The combined laminated structure that consists of a plurality of sheets that contain by weight 99.5% molybdenum and 0.5% titanium that are each 4 mils thick, and that are alternated with a plurality of sheets that contain by weight 80% nickel and 20% chromium and that are less than 2 mils thick.

5. The unitary laminate that consists of layers of molybdenum between 1 and 10 mils in thickness, alternated with layers that consist of by weight 80% nickel and 20% chromium and that are less than 2 mils thick.

6. The unitary laminate that consists of 5 mils thick layers of content by weight 99.5% molybdenum and 0.5% titanium, alternated with layers of content by weight 80% nickel and 20% chromium and less than 2 mils thick.

7. The laminate that consists of a plurality of base metal laminations of molybdenum, alternated with alloy laminations of by weight 80% nickel and 20% chromium.

8. The turbine bucket that comprises a plurality of layers of molybdenum, alternated with layers of the composition by weight of 80% nickel and 20% chromium.

9. The nozzle diaphragm partition that consists of layers of molybdenum, alternated with layers of the composition by weight of 80% nickel and 20% chromium.

10. The article of manufacture that is characterized by high strength and resistance to oxidation at temperatures in the order of 2,000° F. comprising a laminated metal body, the laminae consisting of a plurality of thin sheets of a nickel-chromium alloy that contains by weight about 80% nickel and 20% chromium alternated with thin sheets of molybdenum, the laminated metal body beginning and ending with sheets of the nickel-chromium alloy, the total volume of molybdenum being in excess of two-thirds of the total volume of the laminated metal body and the contacting surfaces of each lamination being welded throughout their contacting areas with adjacent lamination contacting surfaces in an overall unitary metal body.

11. The article defined by the above claim 10 wherein the molybdenum is alloyed with titanium in the proportions by weight of about 99.5 percent molybdenum and 0.5 percent titanium.

References Cited in the file of this patent
UNITED STATES PATENTS

| | | |
|---|---|---|
| 1,228,194 | Fahrenwald | May 29, 1917 |
| 1,940,850 | Derby | Dec. 26, 1933 |
| 2,472,930 | Wilkes | June 14, 1949 |
| 2,473,712 | Kinney | June 21, 1949 |
| 2,763,920 | Turner | Sept. 25, 1956 |
| 2,859,158 | Schaer | Nov. 4, 1958 |
| 2,874,453 | Losco | Feb. 24, 1959 |
| 2,952,904 | Hann | Sept. 20, 1960 |